W. H. RUNGE.
MICROMETER GAGE OR STOP DEVICE FOR LATHES OR THE LIKE.
APPLICATION FILED MAR. 10, 1919.
1,339,984.
Patented May 11, 1920.
2 SHEETS—SHEET 1.
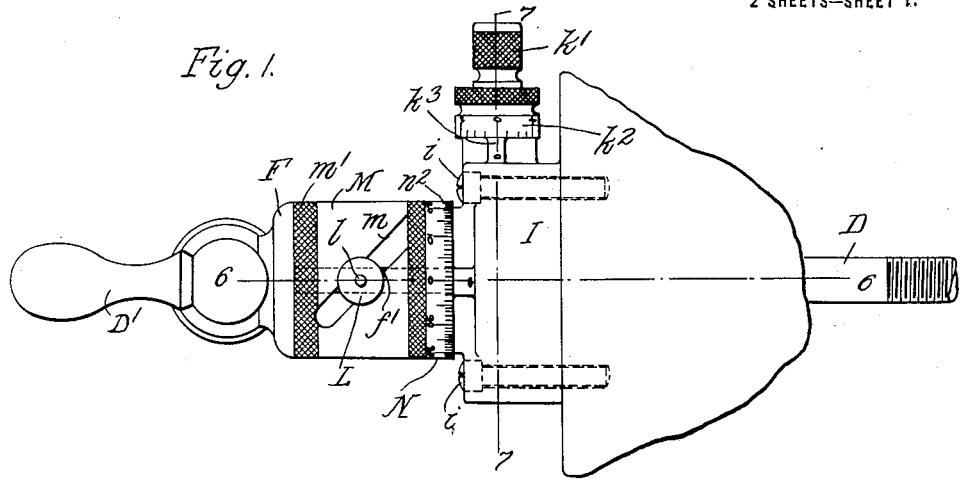
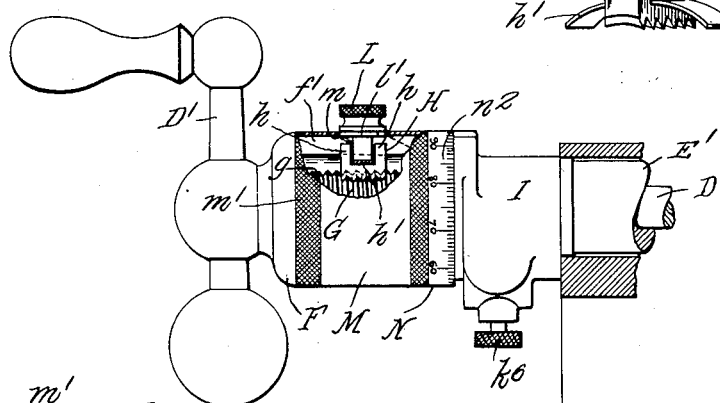
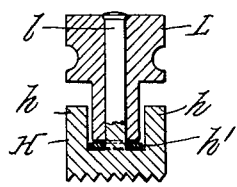
INVENTOR.
William H. Runge
By Wilhelm & Parker
ATTORNEYS.

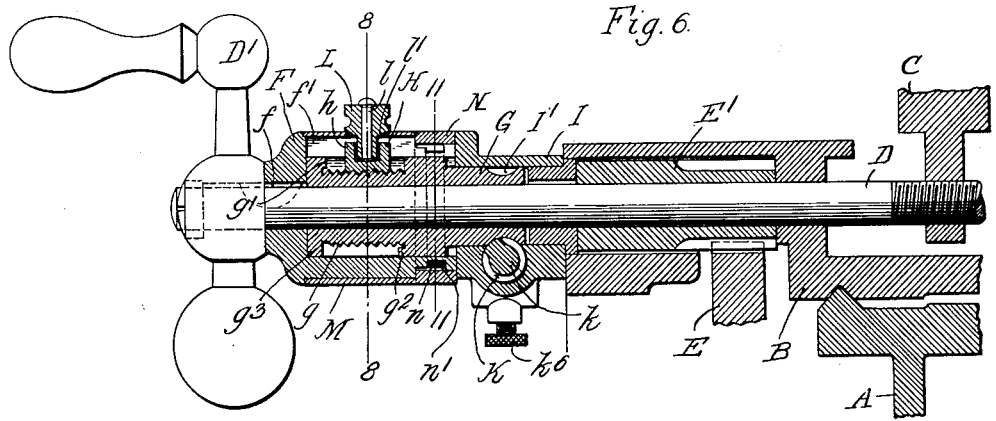

UNITED STATES PATENT OFFICE.

WILLIAM H. RUNGE, OF SENECA FALLS, NEW YORK, ASSIGNOR TO THE SENECA FALLS MANUFACTURING CO., INC., OF SENECA FALLS, NEW YORK.

MICROMETER GAGE OR STOP DEVICE FOR LATHES OR THE LIKE.

1,339,984. Specification of Letters Patent. Patented May 11, 1920.

Application filed March 10, 1919. Serial No. 281,831.

*To all whom it may concern:*

Be it known that I, WILLIAM H. RUNGE, a citizen of the United States, residing at Seneca Falls, in the county of Seneca and State of New York, have invented a new and useful Improvement in Micrometer Gages or Stop Devices for Lathes or the like, of which the following is a specification.

This invention relates to micrometer gages or stop devices which are adapted to be used on lathes or analogous machines and which stop the movement of a part, such as the feed screw for a cutting tool, at a definite predetermined point.

The objects of the invention are to produce a device of this kind of simplified and improved construction in which the micrometer stop or gage may be readily placed into and out of action; also to provide an apparatus of this kind with means of improved construction for keeping dust and foreign matter out of the mechanism and by means of which the mechanism may be quickly adjusted; also to improve devices of this kind in other respects hereinafter specified.

In the accompanying drawings:

Figure 1 is a top plan view of a micrometer gage or stop embodying the invention, showing the same applied to a part of the tool carriage or lathe.

Fig. 2 is an elevation thereof, partly in section.

Fig. 3 is a perspective view showing, on an enlarged scale, the nut which acts as a stop to limit the feeding of the tool to the work.

Fig. 4 is a detached view showing the sleeve which surrounds the micrometer stop.

Fig. 5 is a detached sectional view of the stop nut.

Fig. 6 is a longitudinal sectional elevation of the micrometer gage or stop, on line 6—6, Fig. 1.

Fig. 7 is a transverse sectional elevation thereof on line 7—7, Fig. 1.

Fig. 8 is a transverse sectional elevation thereof on line 8—8, Fig. 6.

Fig. 9 is a similar sectional elevation, on an enlarged scale, showing the parts in different position.

Fig. 10 is a detached view showing the screw-threaded sleeve of the micrometer stop.

Fig. 11 is a transverse sectional elevation on line 11—11, Fig. 6.

A, B and C represent respectively portions of the bed, tool carriage and cross slide of a lathe, and D the cross feed screw or shaft for moving the cross slide toward and from the work, the cross feed screw being provided with the usual operating handle D'. E and E' represent two gears of a power-operated gear train for operating the cross feed screw or shaft. When a micrometer gage or stop embodying the invention is employed, the power-operated gear train is placed out of action since the micrometer stop is intended for use only when the feed screw or shaft is operated by hand.

F represents a shell, barrel or part which is suitably secured to the feed screw D by means of a key $f$ or the like. This shell or barrel extends around a part of a screw or stop sleeve G arranged about the feed screw D and relatively to which the feed screw is adapted to turn. The screw sleeve has a screw-threaded portion $g$ and stops or projecting lugs $g'$ $g^2$ arranged at opposite ends of the screwthreaded portion $g$ in any suitable manner. In the construction shown, these stops are arranged on flanges or annular projecting portions $g^3$ $g^4$ formed on the screw sleeve G and extend inwardly from the flanges $g^3$ $g^4$ toward the screwthreaded portion $g$. The shell or barrel F is provided with a longitudinal guideway or slot $f'$ through which a stop nut or threaded member H extends, the inner end of which is provided with screw threads adapted to mesh with the threads of the portion $g$ of the screwthreaded sleeve G. The nut H extends only partially around the threaded portion of the sleeve G and is provided with upwardly extending arms or parts $h$ extending into the slot $f'$ and which permit the nut to move lengthwise of the slot. A spring $h'$ is preferably employed for holding the stop nut in engagement with the threaded portion of the sleeve G. When the handle D' is turned, the shell or barrel F turns therewith, causing the nut H to rotate about the screw threaded sleeve G, and the threaded end of the nut engaging with the threaded sleeve moves the nut H about the screw sleeve and also lengthwise of the screw sleeve in one direction or another. When the nut strikes one or another of the projections $g'$ $g^2$, the movement thereof and of the cross feed screw is interrupted.

In order to place the projections $g'$ $g^2$ into the proper positions to cause the movement of the feed screw to be stopped at an exact predetermined point, the following construction is preferably employed:—The screwthreaded sleeve G is provided with an extending portion entering into a housing I adapted to be secured to the tool carriage B by any suitable means, such as screws $i$, and is provided with a worm gear I'. This worm gear meshes with a worm or screw-thread K formed on a micrometer screw $k$ suitably journaled in the housing I and which may be turned to adjust the position of the screwthreaded sleeve G about the axis of the cross feed screw D. The micrometer screw $k$ is preferably provided at its outer end with a knurled portion $k'$ which facilitates the turning of the screw and is preferably also provided with a graduated portion $k^2$ mounted on the micrometer screw $k$ and adjustable relatively thereto. The graduated portion coöperates with a line or point $k^3$ formed on the housing I, by means of which the amount of adjustment of the screw sleeve G can be determined. The micrometer screw $k$ may be suitably held in operative relation to the worm gear in any desired manner, an annular groove $k^4$ being formed in the micrometer screw shown, and a pin $k^5$ extending through a hole in the housing I and held in place by means of the set screw $k^6$, being arranged within the annular groove $k^4$ in the micrometer screw and holding the screw $k$ against endwise movement. The set screw $k^6$ is preferably so arranged relatively to the micrometer screw $k$ that the tightening of the set screw will press the pin $k^5$ against the micrometer screw and hold the same in any position in which it is set. Any other means for accurately adjusting the position of the threaded stop sleeve G and for holding the same against movement relatively to the cross feed screw may be employed.

Means are preferably employed for holding the stop nut H out of engagement with the threaded portion of the sleeve G, to render the micrometer stop inoperative, so that the feed screw D may be actuated in the usual manner, either by hand or by means of the power-operated gear train. In the construction shown for this purpose, the stop nut is provided with a knob L which is pivotally mounted on a pin $l$ secured to the nut H. The knob L preferably coöperates with a sleeve M loosely arranged about the shell or barrel F and having a slot $m$ through which a portion of the knob L extends, the slot $m$ preferably extending diagonally of or at an angle to the sleeve M. The knob L is provided with a transverse rib or projection $l'$ which is so formed as to enter into the diagonal slot $m$ when the nut H is in its operative position, as shown in Figs. 2, 6 and 9. In order to move the nut H out of its operative position against the action of the spring $h'$, as shown in Fig. 8, the knob L is pulled outwardly against the action of the spring $h'$ to withdrawn the projection $l'$ out of the slot $m$. This withdraws the threaded portion of the nut out of engagement with the threaded portion of the sleeve G, and by turning the knob L, the projection $l'$ thereof will rest upon the outer surface of the shell M and thus hold the nut out of operative relation to the threaded portion of the sleeve G. The cross feed screw D may then be actuated in the usual manner and the stop nut H will be moved about the axis of the feed screw, but since the threads of the stop nut are not in engagement with the threads on the sleeve G, the stop nut will not move lengthwise of the feed screw and will consequently not move into engagement with either of the stops $g'$ $g^2$. By arranging the slot $m$ in the sleeve M diagonally as indicated in Figs. 1 and 4, the stop nut when in its inoperative position, as shown in Fig. 8, may be moved lengthwise in the slot $m$ of the shell or barrel F by turning the sleeve M in either direction. For this purpose the sleeve is preferably provided with a knurled portion $m'$ which facilitates the turning thereof. The diagonal arrangement of the slot $m$ also forms, to a certain extent, a closure for the slot $f'$ in the shell or barrel F, and thus excludes dust and other foreign matter from the stop mechanism.

N represents a ring which is loosely mounted on the shell or barrel F, a spring $n$ being preferably provided which is arranged in a slot $n'$ in the barrel F, and which bears against the inner face of the ring N to yieldingly hold the same against movement relatively to the barrel F. The outer face of this ring is provided with graduations $n^2$ by means of which the angular position of the barrel F relatively to any fixed point can be readily determined. Any other means for indicating the angular position of the barrel F may be provided.

In the use of the micrometer stop, the power-operated gear train must first be placed out of action. The tool is then fed to the point to which it is desired to cut the work and the shell M is turned to move the stop nut H, which is out of engagement with the sleeve G, as shown in Fig. 8, to the limit of its movement to either end of the threaded part of the screw sleeve G, depending upon whether the lathe is to be used on an inside or outside cut. The knob L is then actuated to place the stop nut H into operative relation to the threaded sleeve G and the micrometer screw $k$ is then turned to place either of the projections $g'$ $g^2$ (depending upon whether the mechanism is adjusted for an inside or outside cut) in contact with the nut H, as shown in Fig. 9. The mechanism is then ready for operation and the tool can be withdrawn by means of the feed screw D. When the tool is again advanced, it can only move to the position for which the mechanism is set, in which position the stop nut H engages with either of the stop projections $g'$ $g^2$.

By making the stop nut H so that the same extends only around a small portion of the circumference of the threaded part of the screw sleeve G, the same can easily be moved out of engagement therewith, and when out of engagement the stop nut can easily be moved lengthwise of the screw sleeve to facilitate adjusting the mechanism. This construction also makes it possible to make the screw sleeve of substantially unitary structure. The outer sleeve M with the oblique or helical slot also facilitates the movement of the nut H lengthwise of the screw sleeve G and keeps dirt or foreign matter from entering the slot or guide-way $f'$ of the barrel F and thus avoids injury to the mechanism.

I claim as my invention:

1. The combination with a rotatable adjusting shaft, a normally stationary stop device which is rotatably adjustable, a coöperating movable stop device, means for moving said movable stop device to engage said stationary stop device by turning said shaft, and means for moving said movable stop device out of engagement with said means for moving the same.

2. The combination with a rotatable adjusting shaft, a normally stationary stop device, a micrometer screw for rotatably adjusting said stop device, a coöperating movable stop device, means for moving said movable stop device to engage said stationary stop device by turning said shaft, and means for moving said movable stop device out of engagement with said means for moving the same.

3. The combination with a rotatable adjusting shaft, a normally stationary stop device which is rotatably adjustable, a coöperating movable stop device, a screw mechanism engaging said movable stop device for moving said movable stop device to engage said stationary stop device, and means for moving said movable stop device out of engagement with said screw mechanism.

4. The combination of a rotatable adjusting shaft, a relatively fixed screwthreaded sleeve arranged about said shaft, a stop device adjacent to one end of said sleeve, a nut which turns with said shaft and has a threaded engagement with said screwthreaded sleeve and which is adapted to move lengthwise of said shaft to engage said stop device, and means for moving said nut out of engagement with said sleeve to stop the lengthwise movement thereof with regard to said shaft.

5. The combination of a rotatable adjusting shaft, a relatively fixed sleeve arranged about said shaft and having a screwthreaded portion and a stop projection, a worm gear rigidly secured on said sleeve, a micrometer screw engaging said worm gear for adjusting said stop projection about said shaft, a nut engaging said threaded portion and movable with said shaft and lengthwise thereof into engagement with said stop projection, and means for holding said nut out of engagement with said threaded portion to prevent said nut from moving lengthwise of said shaft.

6. The combination of a rotatable adjusting shaft, a relatively fixed sleeve arranged about said shaft and having a stop projection and a worm gear, a micrometer screw engaging said worm gear for adjusting said stop about said shaft, a movable stop coöperating with said stop projection, means for moving said movable stop to engage said stop projection by turning said shaft, and means for disconnecting said movable stop from said means for moving the same.

7. The combination with a rotatable adjusting shaft, a normally stationary stop device which is rotatably adjustable, a substantially stationary threaded sleeve arranged about said shaft, a nut extending only partly around said threaded sleeve and engaging therewith to cause said nut to move lengthwise of said shaft into engagement with said stop device, a part rotatable with said shaft and engaging said nut to move the same about the axis of said shaft, and means for moving said nut out of operative relation to said screwthreaded sleeve to prevent movement of said nut lengthwise of said shaft.

8. The combination with a rotatable adjusting shaft, a normally stationary stop device which is rotatably adjustable, a substantially stationary threaded sleeve arranged about said shaft, a nut extending only partly around said threaded sleeve and engaging therewith to cause said nut to move lengthwise of said shaft into engagement with said stop device, and a part rotatable with said shaft and having guide means which engage said nut and permit the same to move substantially lengthwise of said shaft, said nut being adapted to be moved out of operative relation to said threaded sleeve and to be moved lengthwise relatively to said sleeve independently thereof.

9. The combination with a rotatable adjusting shaft, a normally stationary stop device which is rotatably adjustable, a substantially stationary threaded sleeve arranged about said shaft, a nut extending only partly around said threaded sleeve and engaging therewith, a spring for holding said nut in engagement with said sleeve, and a part rotatable with said shaft and engaging said nut to move the same about the axis of said sleeve to cause the nut to move lengthwise of said sleeve into engagement with said stop device, said nut being movable against the action of said spring out of engagement with said sleeve to prevent endwise movement of said nut relatively to said sleeve.

10. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having guide means for said nut to cause the nut to move about said sleeve and lengthwise thereof, and means connected with said nut for withdrawing said nut from engagement with said sleeve and for supporting the nut in this position to prevent endwise movement of the nut.

11. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having guide means for said nut to cause the nut to move about said sleeve and lengthwise thereof, means for holding said nut in operative relation to said threaded sleeve, and means for withdrawing said nut out of operative relation to said sleeve.

12. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having guide means for said nut to cause the nut to move about said sleeve and lengthwise thereof, a shell arranged about said part and having a slot extending at an angle to said guide means and through which said nut extends, and means for supporting said nut on said shell out of engagement with said threaded sleeve.

13. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having a slot extending lengthwise of said shaft and into which said nut extends, and a shell arranged about said rotatable part and having a slot which extends at an angle to said slot in said rotatable part and through which said nut extends, the lengthwise movement of said nut causing said shell to turn relatively to said rotatable part, whereby the slot in said rotatable part is closed by said shell.

14. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having a slot extending lengthwise of said shaft and into which said nut extends, a shell arranged about said rotatable part and having a slot which extends at an angle to said slot in said rotatable part and through which said nut extends, the lengthwise movement of said nut causing said shell to turn relatively to said rotatable part, whereby the slot in said rotatable part is closed by said shell, and a knob secured to said nut and engaging said shell to place said nut into or out of engagement with said threaded sleeve.

15. The combination with a rotatable adjusting shaft, a normally stationary stop device which is rotatably adjustable, a substantially stationary threaded sleeve arranged about said shaft, a nut extending only partly around said threaded sleeve and engaging therewith, a part rotatable with said shaft and having guide means for said nut to cause the nut to move about said sleeve and lengthwise thereof, and a shell arranged about said rotatable part and having a slot extending at an angle to said guide means, said nut being adapted to be supported on said shell when out of engagement with said threaded sleeve and the turning of said shell relatively to said rotatable part causing said nut to move lengthwise of said guide means.

16. The combination of a housing, a micrometer screw rotatably mounted in said housing and having an annular slot, a pin arranged in said housing and extending into said slot, and means for pressing said pin against said screw to hold said screw in an adjusted position.

17. The combination of a housing, a micrometer screw rotatably mounted in said housing and having an annular slot, a pin arranged in said housing and extending into said slot, and means arranged in said housing and adapted to hold said pin in operative position in said housing, said means being adapted to press said pin into holding engagement with said micrometer screw to hold the same against movement.

18. The combination of a housing, a micrometer screw rotatably mounted in said housing and having an annular slot, a pin arranged in said housing and extending into said slot, a pin arranged in said housing and extending into said slot, and a set screw in said housing adapted to engage said pin for holding the same in said housing and adapted to press said pin against said screw to hold said screw against movement.

Witness my hand, this 6th day of March, 1919.

WILLIAM H. RUNGE.

Witnesses:
CLARENCE A. GOULD,
ANNA M. GOULD.